United States Patent
Pizano et al.

(10) Patent No.: US 7,962,755 B2
(45) Date of Patent: Jun. 14, 2011

(54) SYSTEM AND METHOD FOR BIOMETRICALLY SECURED, TRANSPARENT ENCRYPTION AND DECRYPTION

(75) Inventors: Erix Pizano, Tampa, FL (US); Ryan Rohatgi, Lutz, FL (US)

(73) Assignee: Ceelox, Inc., Tampa, FL (US)

( * ) Notice: Subject to any disclaimer, the term of this patent is extended or adjusted under 35 U.S.C. 154(b) by 1017 days.

(21) Appl. No.: 11/380,810

(22) Filed: Apr. 28, 2006

(65) Prior Publication Data

US 2007/0255963 A1    Nov. 1, 2007

(51) Int. Cl.
*G06F 21/00* (2006.01)
*G06F 11/30* (2006.01)

(52) U.S. Cl. ........................ 713/186; 713/189
(58) Field of Classification Search .............. 713/186, 713/189
See application file for complete search history.

(56) References Cited

U.S. PATENT DOCUMENTS

| | | | |
|---|---|---|---|
| 5,774,652 A | | 6/1998 | Smith |
| 6,026,408 A | * | 2/2000 | Srinivasan et al. ............... 1/1 |
| 6,230,165 B1 | | 5/2001 | Cook, III |
| 6,282,649 B1 | * | 8/2001 | Lambert et al. ............ 713/167 |
| 6,321,334 B1 | | 11/2001 | Jerger et al. |
| 6,775,776 B1 | * | 8/2004 | Vogt et al. ................. 713/186 |
| 6,895,104 B2 | | 5/2005 | Wendt et al. |
| 6,925,182 B1 | * | 8/2005 | Epstein .................... 380/277 |
| 7,076,738 B2 | | 7/2006 | Baker et al. |
| 7,117,356 B2 | | 10/2006 | LaCous |
| 7,155,040 B2 | | 12/2006 | Nikiforov |
| 7,164,907 B2 | | 1/2007 | Cochran et al. |
| 7,181,613 B2 | | 2/2007 | Bobert et al. |
| 2002/0019939 A1 | * | 2/2002 | Yamamoto et al. ........... 713/172 |
| 2002/0073120 A1 | * | 6/2002 | Bierbrauer et al. ........... 707/513 |
| 2002/0196940 A1 | * | 12/2002 | Isaacson et al. .............. 380/227 |
| 2003/0065929 A1 | | 4/2003 | Milliken |
| 2003/0217276 A1 | | 11/2003 | LaCous |

(Continued)

FOREIGN PATENT DOCUMENTS

TW    576996 B    2/2004

OTHER PUBLICATIONS

International Preliminary Report on Patentability; Date of Mailing: Nov. 6, 2008; International Application No. PCT/US2007/067504; International Filing Date: Apr. 26, 2007; Applicant: Ceelox Inc. et al.

(Continued)

*Primary Examiner* — Jason K Gee
(74) *Attorney, Agent, or Firm* — Hovey Williams LLP

(57) ABSTRACT

A computer program for enabling biometrically secured, transparent encryption and decryption provides a user interface that allows a user to drag and drop files into and out of a secure repository, wherein the program automatically encrypts files transferred into the repository and automatically decrypts files transferred out of the repository. The user can transfer file folders into the repository, wherein the program encrypts all of the files within the folder and retains the original file/folder structure, such that individual files can be moved within the repository, moved out of the repository, and opened or executed directly from the repository. The program requires the user to submit biometric data and grants access to the secure repository only if the biometric data is authenticated. The program generates an encryption key based at least in part on biometric data received from the user.

14 Claims, 6 Drawing Sheets

U.S. PATENT DOCUMENTS

| | | | |
|---|---|---|---|
| 2004/0064453 A1* | 4/2004 | Ruiz et al. | 707/9 |
| 2004/0103288 A1 | 5/2004 | Ziv et al. | |
| 2004/0123127 A1* | 6/2004 | Teicher et al. | 713/193 |
| 2004/0128520 A1 | 7/2004 | LaCous | |
| 2005/0149742 A1 | 7/2005 | Weis | |
| 2005/0210270 A1* | 9/2005 | Rohatgi et al. | 713/186 |
| 2005/0216830 A1 | 9/2005 | Turner et al. | |
| 2005/0289109 A1 | 12/2005 | Arrouye et al. | |
| 2006/0002599 A1 | 1/2006 | Nikiforov | |
| 2006/0075110 A1* | 4/2006 | Seraphin | 709/227 |
| 2007/0162739 A1 | 7/2007 | LaCous | |
| 2007/0250718 A1* | 10/2007 | Lee et al. | 713/186 |
| 2007/0255963 A1 | 11/2007 | Pizano et al. | |
| 2008/0091833 A1 | 4/2008 | Pizano | |

OTHER PUBLICATIONS

Non-Final Office Action dated Apr. 23, 2009, in U.S. Appl. No. 11/549,206, filed Oct. 13, 2006; Applicant: Pizano, Erix.

Amendment dated Sep. 23, 2009, in U.S. Appl. No. 11/549,206, filed Oct. 13, 2006; Applicant: Pizano, Erix.

Final Office Action dated Dec. 7, 2009, in U.S. Appl. No. 11/549,206, filed Oct. 13, 2006; Applicant: Pizano, Erix.

Response to Final Office Action dated Mar. 8, 2010, in U.S. Appl. No. 11/549,206, filed Oct. 13, 2006; Applicant: Pizano, Erix.

Examiner Interview Summary dated Apr. 12, 2010, in U.S. Appl. No. 11/549,206, filed Oct. 13, 2006; Applicant: Pizano, Erix.

Applicant Interview Summary dated Apr. 23, 2010, in U.S. Appl. No. 11/549,206, filed Oct. 13, 2006; Applicant: Pizano, Erix.

Notice of Allowance dated Apr. 28, 2010, in U.S. Appl. No. 11/549,206, filed Oct. 13, 2006; Applicant: Pizano, Erix.

Request for Continued Examination dated May 11, 2010, in U.S. Appl. No. 11/549,206, filed Oct. 13, 2006; Applicant: Pizano, Erix.

Notice of Allowance dated Jun. 16, 2010, in U.S. Appl. No. 11/549,206, filed Oct. 13, 2006; Applicant: Pizano, Erix.

International Preliminary Report on Patentability; Date of Mailing: Apr. 23, 2009; International Application No. PCT/US2007/080522; International Filing Date: Oct. 5, 2007; Applicant: Ceelox, Inc.

Gasior, Geoff; A-Data's FP1 fingerprint flash drive Encryption made easy; http://techreport.com/articles.x/13486; Posted Date: Nov. 2, 2007; Printed Date: Jul. 23, 2010.

Tingle, Andrew; Buffalo RUFF2-FHS Secure USB Flash Drives With Fingerprint Reader [Secure Portable Data Storage]; http://nexus404.com/Blog/2008/04/16/buffalo-ruff2-fhs-secure-usb-Flash-drives-with-fingerprint-reader-secure-portable-data-storage-2/; Posted Date: Apr. 16, 2008; Printed Date: Jul. 23, 2010.

McGlaun, Shane; Ennova Biometric Flash Drive Receives Patent; http://www.i4u.com/article24463.html; Posted Date: Apr. 29, 2009; Printed Date: Jul. 23, 2010.

Kingston Flash Memory DataTravler Family—USB Flash Drives; http://www.kingston.com/Flash/datatraveler_home.asp; Posted Date: Unknown; Printed Date: Jul. 23, 2010.

Derek; The next generation of file sharing with the Leyio PSD; http://blogs.totalpda.co.uk/2009/04/the-next-generation-of-file-sharing-with-the-leyio-psd/; Posted Date: Apr. 24, 2009; Printed Date: Jul. 23, 2010.

Unique LG Biometric and Anti-virus USB Drives introduced; http://www.techshout.com/hardware/2007/20/unique-lg-biometric-and-anti-virus-usb-drives-introduced/; Posted Date: Dec. 20, 2007; Printed Date: Jul. 23, 2010.

Slash Gear; http://www.slashgear.com/mxi-security-unveils-stealth-bio-mxp-encrypted-flash-drive-1269598/; Posted Date: Jan. 12, 2010; Printed Date: Jul. 23, 2010.

Transcend JetFlash 220 featured on USTV; http://www.transcendusa.com/Press/index.asp?LangNo=0&axn=Detail&PrsNo=824&NewsKeyWd=JetFlash%20220; Posted Date: Oct. 15, 2007; Printed Date: Jul. 23, 2010.

Translation of Taiwanese Office Action for Application No. 096114976, dated Jan. 14, 2011, 8 pages.

* cited by examiner

| Volume | Vault Folder | Host Computer Folder (Full Path) | Pair Name | Order of Execution |
|---|---|---|---|---|
| Flash Drive | FlashPics | F:\MyPics | FlashPics | 1 |
| Laptop HDD | LaptopPics | C:\Docs\1\MyPics | LaptopPics | 2 |
| Network Drive | NetworkPics | K:\Personal\MyPics | NetworkPics | 3 |

SYSTEM AND METHOD FOR BIOMETRICALLY SECURED, TRANSPARENT ENCRYPTION AND DECRYPTION

BACKGROUND OF THE INVENTION

1. Field of the Invention

The present invention relates to the field of data encryption and user authentication. More particularly, the present invention involves a system and method for transparently encrypting and decrypting digital data, wherein the encryption and decryption is managed in a biometrically secured process.

2. Description of Prior Art

Protecting sensitive computer data such as personal financial information, social security numbers, etcetera, is of the utmost importance to individuals, businesses, and the government. Sensitive data may be protected, in part, by isolating data storage devices, such as computer hard drives, from computer networks so that users at remote locations cannot "hack" into the sensitive data. Isolation does not protect the data, however, in the event such storage devices are physically stolen or directly accessed on-sight by a malefactor. Furthermore, in some situations it is impractical or impossible to isolate data from computer networks or to maintain it in a single, physically secure location.

An alternative method of protecting digital data is by use of encryption, which is the process of encoding information in such a way that only a person (or computer) with a proper key can decode it. Thus, even if an unauthorized person gains access to sensitive data, the data is safe so long as the person does not have the key. Most encryption schemes fall into one of two categories: symmetric and asymmetric.

In symmetric encryption schemes, each computer has a secret key, or code, that it uses to encrypt a packet of information before the packet is stored on a data storage device or is sent over a network connection to another computer. Each computer uses the key to decrypt a packet of information encrypted using the same key, even if the packet was encrypted and sent by another computer. Symmetric encryption requires each computer to have a copy of a shared private key, and therefore requires users to be aware of which computers will be communicating to ensure that each computer has a copy of the key. If the shared key is communicated via a network medium, it may be intercepted by a third party who is then able to use the key to decrypt encrypted data and information.

Asymmetric encryption schemes use both a publically-accessible key and a private key, and eliminate the need for a shared private key to ever be communicated between computers. An example is a system wherein two computers each have a public key and a private key. Each computer is able to generate an identical shared private key using its private key, its public key, and the other computer's public key.

Unfortunately, encryption suffers from various problems and limitations that render it unsatisfactory in many circumstances. Encryption software, for example, is time consuming to use and is often difficult to learn. Consequently, users may encrypt only a portion of the sensitive data they would otherwise protect—or may forego data encryption altogether—in order to avoid spending time using, or learning how to use, the software.

Furthermore, encrypting data in a portable device is susceptible to circumvention because the key is hidden on a data storage element on the device itself. Thus, a person who discovers the key has access to the encrypted data stored on the device.

Accordingly, there is a need for an improved system of encryption and decryption that does not suffer from the problems and limitations of the prior art.

SUMMARY OF THE INVENTION

The present invention provides an improved encryption system that does not suffer from the problems and limitations of the prior art. Particularly, the present invention provides a system and method for transparently encrypting and decrypting data that requires virtually no user effort, wherein the encryption and decryption is managed in a biometrically secured process.

A first embodiment of the invention is a computer program for enabling a secure storage system, wherein at least a portion of the program is stored on a computer-usable medium. The computer program comprises a code segment for encrypting a file designated by a user and storing the file in a secure repository, wherein the program encrypts and stores the file in response to the user selecting the file and selecting the repository and with no further action from the user. The program further comprises a code segment for decrypting the file and storing the file in a location external to the repository, wherein the program decrypts and stores the file in response to the user selecting the file from the repository and selecting the external location and with no further action from the user.

According to a second embodiment of the invention, the program receives biometric data from a user, creates an encryption key based at least in part on the biometric data, encrypts a data file using the encryption key, and decrypts the data file using the encryption key.

A third embodiment of the invention is a system for managing a secure data repository. The system comprises a computer processor, a data storage medium for maintaining the secure repository and for storing a computer program for enabling the computer processor to manage the secure repository, and a biometric scanner for sensing biometric data associated with a person and communicating the biometric data to the computer processor.

The computer program comprises various code segments, including code segments for receiving biometric data from a user via the biometric sensor; granting the user access to the secure repository only if the biometric data received from the user corresponds to biometric data stored in a database; creating an encryption key based at least in part on at least a portion of the biometric data; encrypting a data file using the encryption key; and decrypting the data file using the encryption key.

In a third embodiment of the invention, the program encrypts and stores a file in response to the user selecting the file, selecting the repository, and performing only minimal first additional action; and decrypts and stores a file in response to the user selecting the file from the repository, selecting the external location, and performing only minimal second additional action.

These and other important aspects of the present invention are described more fully in the detailed description below.

BRIEF DESCRIPTION OF THE DRAWINGS

An embodiment of the present invention is described in detail below with reference to the attached drawing figures, wherein.

DETAILED DESCRIPTION

Figure 1:
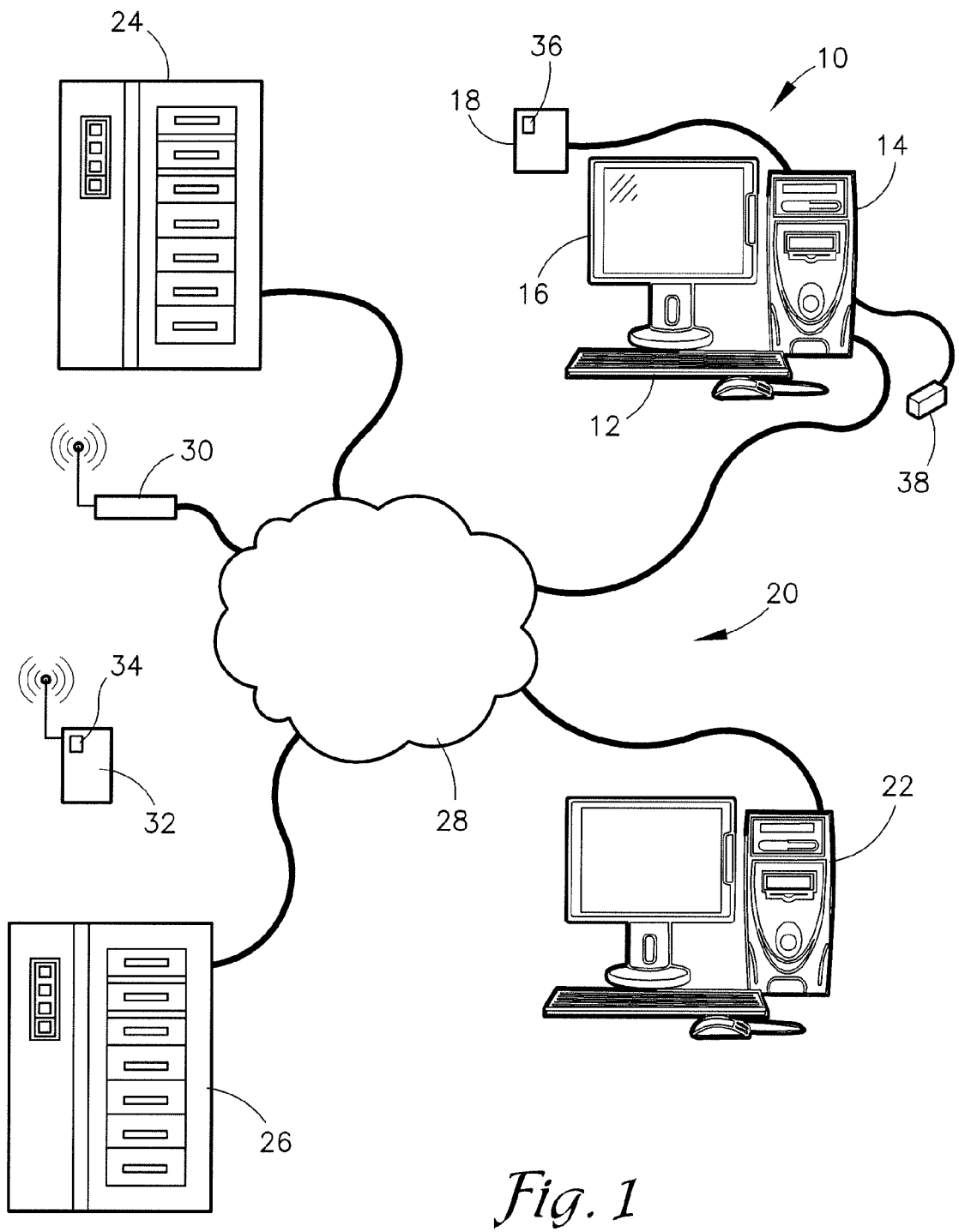
FIG. 1 is a schematic diagram of an exemplary system for implementing a computer program in accordance with an embodiment of the present invention, wherein the program implements a method of secure, transparent data encryption and decryption.

The present invention relates to a system and method of transparently encrypting and decrypting data via a biometrically secure process. The method of the present invention is especially well-suited for implementation on a computer or computer network, such as the computer 10 illustrated in FIG. 1 that includes a keyboard 12, a processor console 14, a display 16, and one or more peripheral devices 18,38, such as an external data storage device, biometric data sensor, scanner, or printer. The computer 10 may be a part of a computer network, such as the computer network 20 that includes one or more client computers 10,22 and one or more server computers 24,26 and interconnected via a communications system 28. The present invention may also be implemented, in whole or in part, on a wireless communications system including, for example, a network-based wireless transmitter 30 and one or more wireless receiving devices, such as a hand-held computing device 32 with wireless communication capabilities. The present invention will thus be generally described herein as a computer program. It will be appreciated, however, that the principles of the present invention are useful independently of a particular implementation, and that one or more of the steps described herein may be implemented without the assistance of a computing device.

The present invention can be implemented in hardware, software, firmware, or a combination thereof. In a preferred embodiment, however, the invention is implemented with a computer program. The computer program and equipment described herein are merely examples of a program and equipment that may be used to implement the present invention and may be replaced with other software and computer equipment without departing from the scope of the present invention.

The computer program of the present invention is stored in or on a computer-useable medium, such as a computer-readable medium, residing on or accessible by a host computer for instructing the host computer to implement the method of the present invention as described herein. The host computer may be a server computer, such as server computer 24, or a network client computer, such as computer 10. The computer program preferably comprises an ordered listing of executable instructions for implementing logical functions in the host computer and other computing devices coupled with the host computer. The computer program can be embodied in any computer useable medium, such as a computer-readable medium, for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by those skilled in the art that the program may comprise a single list of executable instructions or two or more separate lists, and may be stored on a single computer-useable medium or multiple distinct media. The program will also be described as comprising various "code segments," which may include one or more lists, or portions of lists, of executable instructions. Code segments may include overlapping lists of executable instructions, that is, a first code segment may include instruction lists A and B, and a second code segment may include instruction lists B and C.

In the context of this application, a "computer-useable medium" can be any means that can contain, store, communicate, propagate or transport the program for use by or in connection with the instruction execution system, apparatus, or device. The computer-useable medium can be, for example, but not limited to, an electronic, magnetic, or semiconductor system, apparatus, or device or medium. More specific, although not inclusive, examples of computer-useable media would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-useable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The computer program of the present invention transparently encrypts data and stores the data in a secure repository by way of a biometrically secure process. A particular secure repository is referred to herein as a "vault." As used in this document, a "vault" includes any computer-useable medium—as described above—that is operable to store data, such as a computer hard drive or other magnetic storage medium. The program automatically encrypts data moved into the vault and decrypts data moved out of the vault so that users can quickly and easily secure sensitive data. The vault is protected by an authentication system that requires biometric data, a password, or both, to gain access to the vault.

Figure 2:
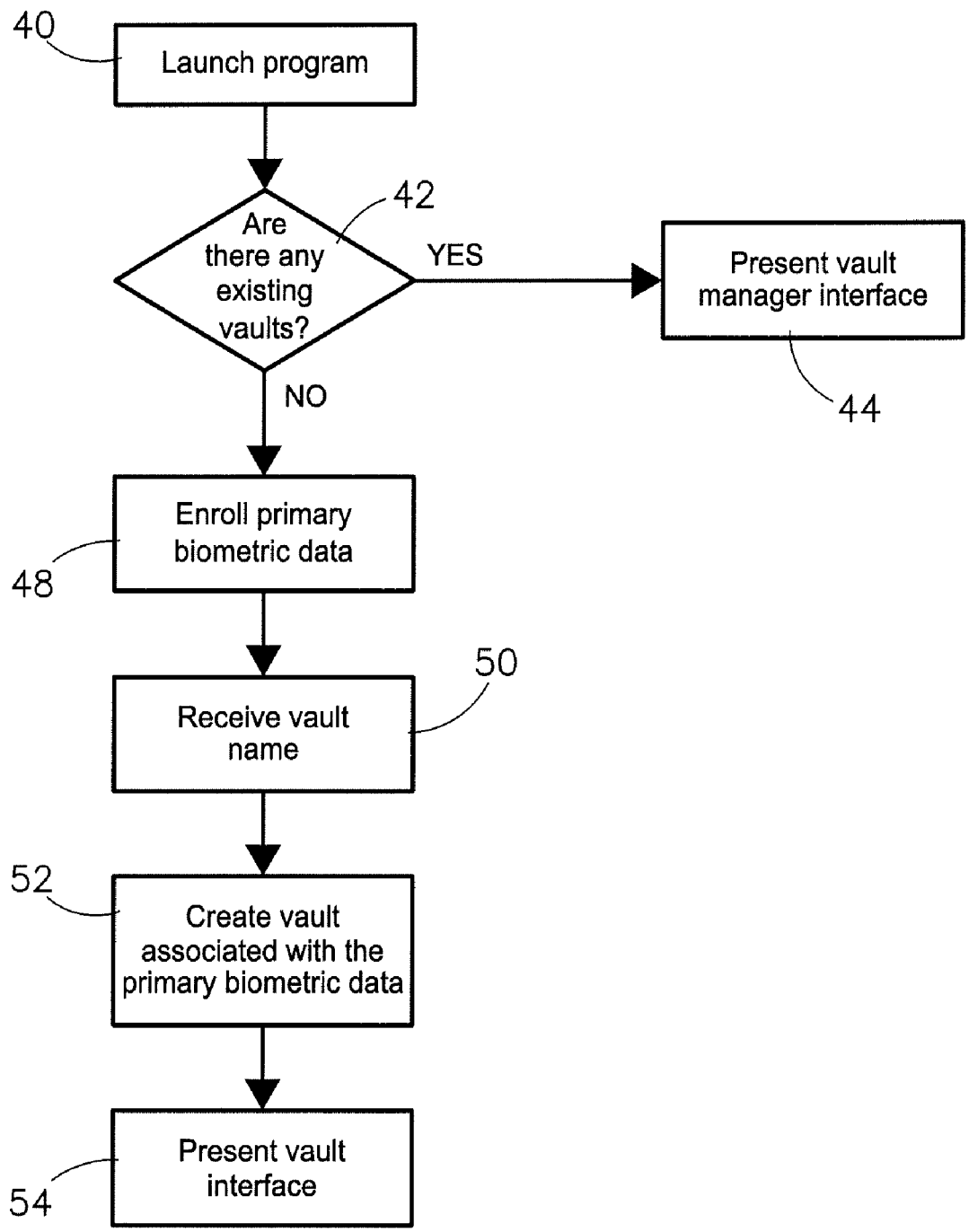
FIG. 2 is a flow diagram of certain steps performed by the computer program when the program is first launched.
Figure 5:
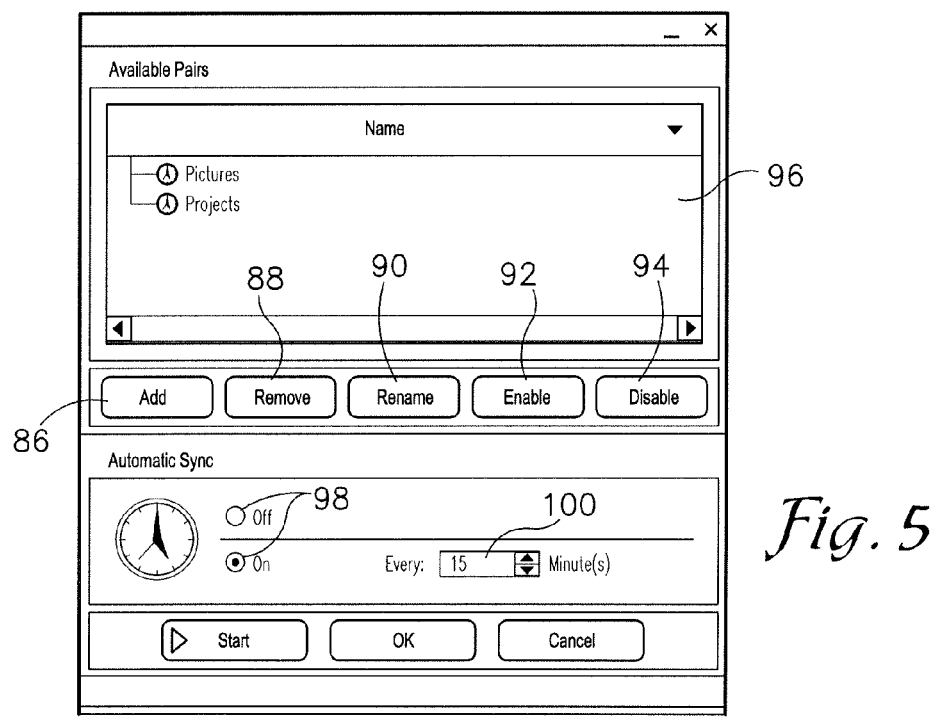
FIG. 5 is an exemplary user interface associated with the computer program for enabling a user to manage a synchronization function of the program.

Referring to FIG. 2, a flow diagram of steps involved in launching the program is illustrated. The program is first launched in a conventional manner, as depicted in block 40. When the program is launched, it first determines whether there are any existing vaults, as depicted in block 42. There may be existing vaults if the program was previously run and created vaults that were saved to a storage device. If the program discovers existing vaults, it presents a vault manager interface (FIG. 5), as depicted in block 44. The vault manager is described in detail below.

If the program does not discover an existing vault, the program begins the process of creating a new vault by enrolling primary biometric data that will be associated with the new vault, as depicted in block 48. The primary biometric data is associated with a primary user, or the user who creates the vault. If the biometric data used by the program is fingerprint data, enrolling the primary data includes scanning a first fingerprint, creating a first primary biometric (fingerprint) template from the first fingerprint, scanning a second fingerprint, and creating a second primary biometric (fingerprint) template from the second fingerprint.

The computer 10 receives biometric data from a user via a standalone biometric sensor 38, such as a standalone fingerprint scanner, or via a biometric sensor 36 that is housed in another device 18, such as a fingerprint scanner that is built into a hard drive enclosure, sometimes referred to as a "bio drive."

The program encodes the two biometric templates using, for example, a hashing algorithm that involves fragmenting template data, resorting the fragmented data, and storing the resorted data in a database. The program uses a different hashing algorithm for each vault to ensure that no two vaults have the same hashed template data, even if both vaults were created by the same user. The program destroys the first and second (unhashed) primary biometric templates so that only the hashed template data is stored in a database. The program decodes (unhashes) the encoded template data only if it authenticates a user, as explained below.

The program creates an encryption key using the first and second primary biometric templates and thus must decode the encoded template data to create the encryption key. The encryption key is based at least in part on the templates, and preferably is further based on one or more other elements such as, for example, biometric data received from the user and not included in the templates and/or the unique hashing algorithm associated with the vault. After an encryption or decryption operation, the program destroys the key and the biometric templates, preserving only the encoded template data.

The biometric sensor 18 as illustrated and described herein is a fingerprint scanner for capturing fingerprint data, but it will be appreciated that substantially any biometric data may be used without departing from the scope of the claimed invention including, but not limited to, voice print data, retinal scan data, iris scan data, facial characteristics, and behavioral characteristics, such as signature data. Such biometric data may be captured and analyzed using conventional hardware and processes known in the art. Furthermore, the biometric data used by the claimed invention may be any combination of one or more types of such biometric data.

The program may alternatively receive and use a password in lieu of the biometric data where, for example, the program is installed on a computer that does not have an associated biometric sensor. When using only a password, the program associates the vault with the password and may use the password to create the encryption key. The program may create an artificial biometric template and use the artificial biometric template as if it were an actual biometric template described above, and may supplement the template with, for example, information taken or derived from the password to create the encryption key. Alternatively, the program may use both biometric data and a password, and may supplement the biometric template with information taken or derived from the password to create the encryption key. In yet another alternative, the program may require the user to submit either biometric information or a password as the user wishes. The program will generally be described below as using biometric data with the understanding that a password may be used in lieu of, or in combination with, the biometric data.

Once the program enrolls the primary biometric data (or password) associated with the vault, the program receives the name of the vault from the user, as depicted in block 50. With the primary biometric data and the name of the vault, the program creates the vault associated with the primary biometric data, as depicted in block 52, and presents a vault interface, as depicted in block 54. The user can then move data files into and out of the vault using the vault interface (FIG. 3), as explained in greater detail below.

At any time during use of the program, the user can choose to enroll secondary biometric data (or a secondary password) to be associated with the vault, wherein the secondary biometric data (or password) is from a second user. The process of enrolling the secondary biometric data may be substantially similar to the process of enrolling the primary biometric data, except that the secondary biometric data is not used to create the encryption key. In enrolling the secondary biometric data, the program receives biometric information from the user, creates one or more biometric templates, and encodes biometric template data. Thereafter, the secondary user is authenticated when he or she submits the biometric data, the program encodes the biometric data and matches the encoded biometric data with encoded biometric data stored in the database. Any number of secondary users may submit secondary data to enable them to gain access to the vault.

Figure 3:
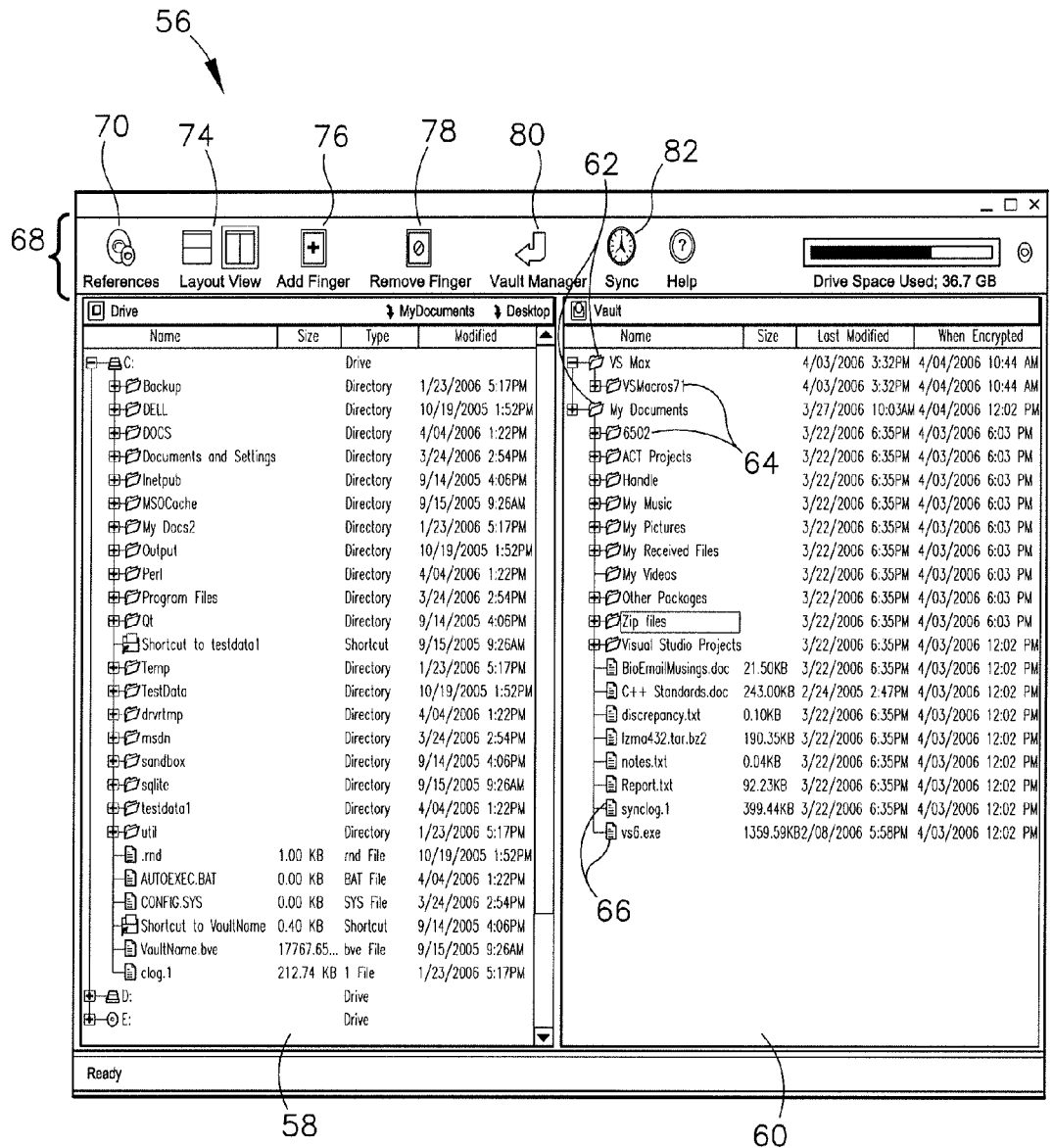
FIG. 3 is an exemplary user interface associated with the computer program for enabling the user to transfer files into and out of a secure repository.

An exemplary vault interface 56 is illustrated in FIG. 3. The interface 56 is a graphical user interface with various interface elements for managing the transfer of files into and out of the vault, as well as for managing interface preferences. The illustrated interface 56 presents a first window 58 and a second window 60. The first window 58 lists various drives, folders, sub-folders, and files stored on mediums generally accessible by the computer 10. The second window 60 lists various folders, sub-folders, and files stored in the vault.

To move a file into the vault, the user selects the file from the first window 58 and selects the second window 60 or a specific location within the second window 60. In response to the user selecting the file and selecting the second window 60, the program retrieves the selected file, encrypts the file using the encryption key created from the biometric data, and stores the encrypted file in the vault. Once the file has been stored in the vault, the program lists the file name in the second window 60, according to the location of the file relative to other files and folders in the vault.

The program is operable to encrypt and store the file in response to the user selecting the file and selecting the second window 60 and with no further action from the user, or with no other action by the user intermediate the acts of selecting the file and selecting the repository. By way of example, the user may select a file by positioning a display pointer over the file using a computer mouse, depressing a mouse button, dragging the file to the second window 60 by moving the mouse, and releasing the mouse button so that the file "drops" into the second window 60. The user sees the file copied or moved to the second window 60, but does not have to request or prompt the program to encrypt the file—the program automatically encrypts the file before storing it in the vault.

Alternatively, the program may encrypt and store the file in response to the user selecting the file, selecting the repository, and performing only minimal additional action, such as responding to a confirmation request generated by the program. Such minimal additional action may include one or more user actions but does not substantially extend the time or effort required by the user beyond that required by the act of selecting the file and selecting the repository.

To move a file from the vault to a storage location external to the vault, the user selects a file listed in the second window 60 and selects a location listed in the first window 58. In response to the user selecting the file and selecting the location, the program decrypts the file and stores it at the user-selected location.

The program is operable to decrypt and store the file in the selected location in response to the user selecting the file and selecting the location and with no further action from the user, or with no other action by the user intermediate the acts of selecting the file and selecting the location. By way of example, the user may select a file from the second window 60 by positioning a display pointer over the file using a computer mouse, depressing a mouse button, dragging the file to a particular location listed in the first window 58 by moving the mouse, and releasing the mouse button so that the file "drops" into the location listed in first window 58. The user sees the file copied or moved to the first window 58, but does not have to request or prompt the program to decrypt the file—the program automatically decrypts the file before storing it at the selected location.

Alternatively, the program may decrypt and store the file in response to the user selecting the file, selecting the location, and performing only minimal additional action, such as responding to a confirmation request generated by the program. Such minimal additional action may include one or more user actions but does not substantially extend the time or effort required by the user beyond that required by the act of selecting the file and selecting the target location.

The program is also operable to move file folders into and out of the vault in the manner described above, wherein a folder contains one or more files, subfolders, or both. When moving folders into the vault, the program retains the folder/subfolder/file structure by encrypting each file separately from other files stored in the folder, creating folders and subfolders in the vault corresponding to the folders and subfolders selected by the user, and storing the encrypted files in the folders and subfolders of the vault according to the original structure of the selected files. Once a folder has been created in the vault the user can place files into the folder, including files moved into the vault from an external location and files already stored in the vault but not in the folder. Furthermore, with one or more folders in the vault, as illustrated in the second window 60 of the interface 56, the user may place a file in the vault by selecting the second window 60 generally or by selecting a particular location within the second window 60.

As illustrated in FIG. 3, the second window 60 illustrates a plurality of folders 62, subfolders 64, and files 66 stored in the secured vault. Folders listed in the second window 60 may be expanded to reveal subfolders and files contained therein, and may be condensed to hide the subfolders and files. If a user selects a folder from the first window 58 and moves the folder into the vault, the folder will appear in the second window 60 substantially identically as it appeared in the first window 58, including the subfolder/file structure.

The program enables users to access files directly from the second window 60 of the vault interface 56. In other words, users can view or launch encrypted files listed in the second window 60 without first requesting that the program decrypt the files. By way of example, if the user positions a display pointer over the file labeled "notes.txt" in the second window 60 using a computer mouse and double clicks a mouse button, the program responds by automatically decrypting the file, launching an external application that is compatible with the file (such as a text editor), and displaying the file in a user interface generated by the application. If the user selects an executable file in a similar manner, the program automatically decrypts the executable file and executes code associated with the file.

The vault interface 56 includes a toolbar 68 with various icons representing selectable functions associated with the vault. Selecting a preferences icon 70 invokes a preferences window 102 illustrated in FIG. 7 and described below in greater detail.

Figure 4:
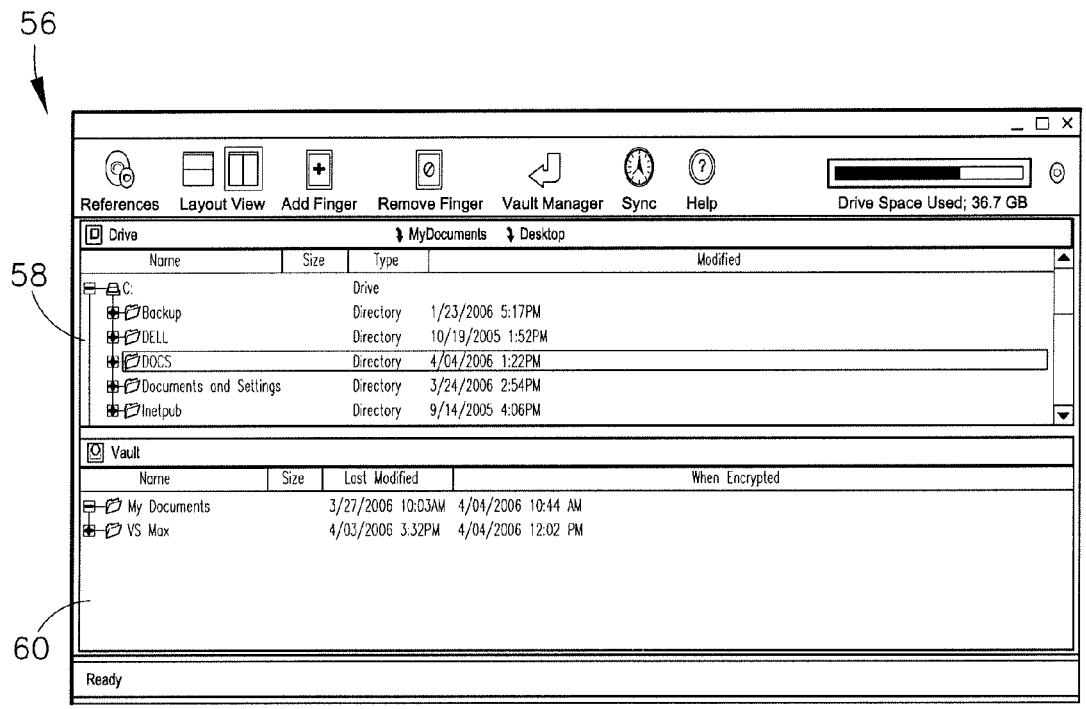
FIG. 4 illustrates an alternative layout of the user interface of FIG. 3.

Selecting a layout view icon 74 modifies the manner in which the program presents information contained in the first window 58 and the second window 60. The vault interface 56 may toggle between a vertical layout view (FIG. 3) and a horizontal layout view (FIG. 4), wherein the horizontal layout view presents the first window 58 above the second window 60.

Selecting an add finger icon 76 causes the program to enroll secondary biometric data, including the steps of receiving the data from a user and associating the data with the vault, as explained above. Selecting a remove finger icon 78 causes the program to disassociate secondary biometric data from the vault so that the user associated with the biometric data is no longer granted access to the vault. When a user selects the remove finger icon 78, the program prompts the user associated with the biometric data to be removed to submit anew the biometric data, thus preventing a first user from disassociating a second user's biometric data from the vault without the second user's consent.

Selecting a vault manager icon 80 causes the program to present a vault manager interface illustrated in FIG. 8 and discussed below. Selecting a sync icon 82 presents a synchronization manager interface 84 illustrated in FIG. 5. The synchronization manager interface 84 enables the user to set up and manage synchronization pairs. Synchronization involves comparing the contents of two folders and updating the contents of either or both folders so that each folder contains the most recent version of each file contained in the other folder.

More specifically, a synchronization pair consists of two folders, a first folder that is inside the vault called the vault folder, and a second folder that is outside the vault called the host computer folder. The program synchronizes the two folders by first updating the host computer folder. It does this by determining which files in the vault folder do not exist in the host computer folder, decrypting those files, and placing a copy of each decrypted file in the host computer folder. The program then compares the ages of the files in the vault folder with the ages of matching files in the host computer folder and replaces older files in the host computer folder with matching newer files in the vault folder. The program then updates the vault folder in the way it updated the host computer folder, except that files that are moved from the host computer folder to the vault folder are encrypted.

Figures 6, 7:
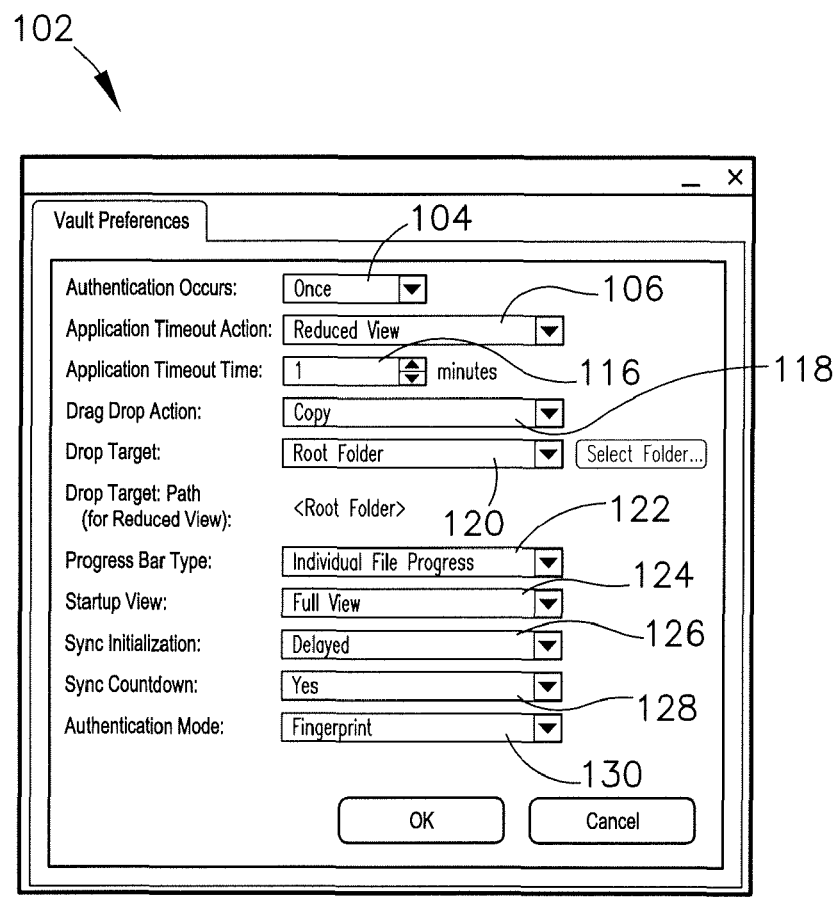
FIG. 6 is an exemplary list of folder pairs whose contents are synchronized by the synchronization function of the computer program.
FIG. 7 is an exemplary user interface associated with the computer program for enabling a user to select various preferences associated with the secure repository.

A group of synchronization pairs is illustrated in FIG. 6. A first pair named "FlashPics" includes a folder labeled "MyPics" stored on a flash drive; a second pair named "LaptopPics" includes a folder labeled "MyPics" stored on a laptop computer hard drive; and a third pair named "NetworkPics" includes a folder labeled "MyPics" stored on a network drive. Synchronization occurs alphabetically according to pair name. For example, files in the flash drive folder "MyPics" are first synchronized with files in the vault folder "FlashPics." Then, files in the laptop folder "MyPics" are synchronized with files in the vault folder "LaptopPics." Finally, files in the network drive folder "MyPics" are synchronized with files in the vault folder "NetworkPics."

The synchronization manager interface 84 includes an add button 86 for creating a synchronization pair; a remove button 88 for deleting a synchronization pair; a rename button 90 for renaming a synchronization pair; an enable button 92 for enabling a synchronization pair that was previously disabled; and a disable button 94 for disabling a synchronization pair. When a synchronization pair is disabled, the program retains an association between the folders of the pair but does not synchronize the contents of the folders. When a user selects the enable button 92, the program begins performing synchronization of the folders.

A synchronization pair window 96 presents a list of existing synchronization pairs. Automatic synchronization on/off radio buttons 98 enable a user to turn automatic synchronization on and off, and a time interval selector 100 enables the user to select a time interval between each automatic synchronization. Such intervals may be one minute, two minutes, five minutes, ten minutes, fifteen minutes, twenty minutes, thirty minutes, sixty minutes, or virtually any other time interval expressed in seconds, minutes, hours, days, etcetera.

The program identifies a particular drive associated with each host computer folder to ensure that the program can distinguish between host computer folders that have the same path name. This may arise, for example, where a user has a folder on a work computer with the path "c:\pics" and a folder on a home computer with the same path name, and has created a synchronization pair involving the "pics" folder on the home computer. The program identifies the drive on the home computer containing the "pics" folder according to a drive serial number and a drive volume label, which are different than the serial number and volume label of the drive on the work computer. Thus, the program does not synchronize a folder pair unless it can verify that the drive associated with a host computer folder is the same drive that was associated with the host computer folder when the synchronization pair was created.

An exemplary vault preferences interface 102 is illustrated in FIG. 7 and enables users to change various program settings. A first drop-down menu 104 enables the user to determine how often the program requires user authentication. Authentication includes submitting biometric data via the biometric data sensor so that the computer can verify that the submitted biometric data corresponds to enrolled biometric data. Options available via the menu 104 may include "once" and "always." If "once" is selected, the program requires authentication only when the vault is opened, if "always" is selected, the program requires authentication each time a user attempts to perform an action in or to the vault, including adding an item to the vault, removing an item from the vault, enrolling secondary biometric data, and changing preferences.

A second drop-down menu 106 provides options associated with actions the program takes upon the occurrence of a timeout. Timeout occurs when a predetermined time has passed during which no user has interacted with the program. Options available via the menu 106 may include "reduced view," "exit the application," and "none." The "reduced view" setting will cause the program to go into a reduced view mode, which involves generating an icon that is generally smaller in size than other user interfaces associated with the program. The "exit the application" setting will cause the program to exit upon occurrence of timeout. Selecting the "none" option essentially disables timeout.

Figure 9:
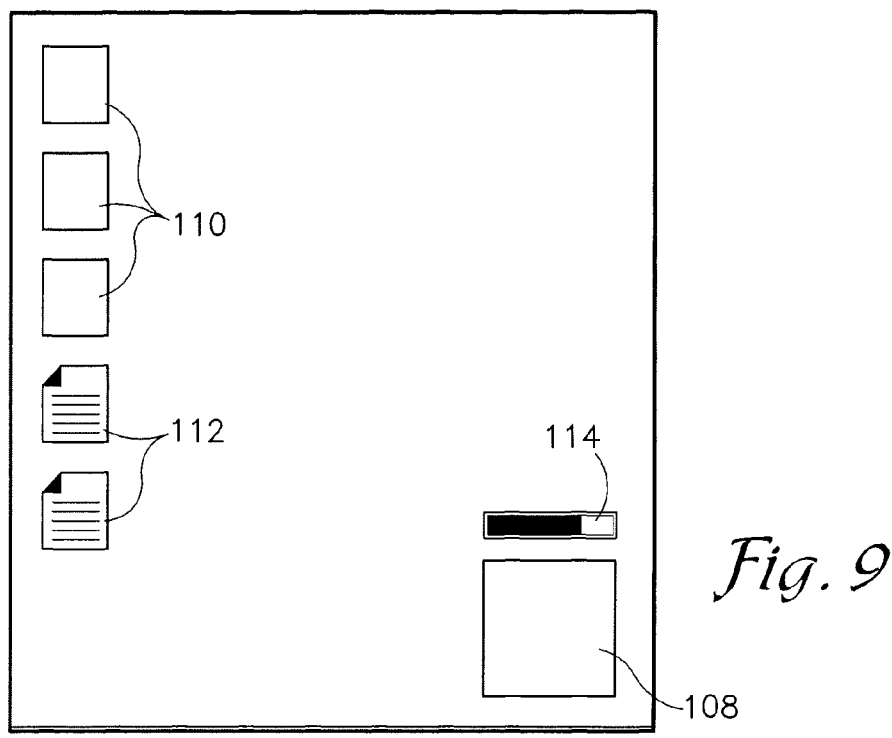
FIG. 9 is an exemplary graphical user interface of a computer operating environment including an icon associated with the secure repository.

An exemplary reduced view icon 108 is illustrated in FIG. 9, wherein the icon 108 is illustrated as part of an interface associated with a computer operating environment that also displays one or more icons 110 associated with executable program code as well as one or more icons 112 associated with files or file folders. A progress bar 114 may also be associated with the icon 108 and indicate, for example, a percentage completion of an encryption or decryption process.

In a particular implementation, the program generates an icon for a WINDOWS™ desktop interface. In the reduced view, users can drag files from a location external to the program icon, such as from the WINDOWS™ desktop or from the WINDOWS EXPLORER™ program, to the program icon, wherein the program encrypts the files and stores them in the vault.

A third drop-down menu 116 enables users to determine the length of time that passes without interaction from the user before timeout occurs. The options available via the menu 116 include one, two, three, four, five, ten, fifteen, twenty, twenty-five, thirty, forty-five, and sixty minutes. These values are exemplary in nature and virtually any length of time may be included in the drop-down menu 116.

A fourth drop-down menu 118 provides drag-and-drop action options. These options include "copy," "move," and "prompt." When the "copy" option is selected, dragging and dropping a file into or out of a vault copies the file so that the original remains. When the "move" option is selected, dragging and dropping a file into or out of a vault moves the file so that the original is deleted. When the "prompt" option is selected, the program prompts the user to select copy or move each time the user uses the drag and drop function.

A fifth drop-down menu 120 provides drag and drop target options associated with the reduced view and includes "root" and "select" options. When the "root" option is selected, the program places files in the root (top level) of the vault. When the "select" option is selected, the program allows the user to select a particular folder or subfolder in the vault as the target folder.

A sixth drop-down menu 122 enables users to select a type of progress bar used in the vault interface 56. The progress bar associated with the vault interface 56 provides an indication of task progress in a conventional manner. Such tasks may include encryption, decryption, deletion, import, export, and so forth. Options provided in the drop-down menu 122 include "individual file progress" and "total file progress." When the "individual file progress" option is selected the program provides an indication of the progress of each file individually via the progress bar. This is used, for example, where a user selects a folder with multiple files, or selects multiple files. When the "total file progress" option is selected, the program provides an indication of the progress of the entire group of files.

A seventh drop-down menu 124 provides options relating to the type of user interface the program presents at startup. The options provided by the drop-down menu 124 include "reduced view" and "full view." A reduced view icon 108 is illustrated in FIG. 9, as explained above. The full view is either the vault manager interface (FIG. 8) or the vault interface 56, depending on whether the program discovers a pre-existing vault at startup.

An eighth drop-down menu 126 provides synchronization options including "disabled," "delayed," and "immediate." When the "disabled" option is selected, synchronization never initiates automatically but must be manually started by a user. When the "delayed" option is selected, synchronization occurs automatically a pre-determined time period after startup. When the "immediate" option is selected, the program automatically synchronizes all folder pairs immediately upon startup.

A ninth drop-down menu 128 enables users to determine whether a visible countdown will precede a synchronization. A tenth drop-down menu 130 provides authentication mode options. When a "fingerprint" option is selected, the program requires a fingerprint only to authenticate a user. When a "password" option is selected, the program requires a password only to authenticate. When a "fingerprint or password" option is selected, the program requires a fingerprint or password to authenticate. When a "fingerprint and password" option is selected, the program requires both a fingerprint and a password to authenticate a user.

Figure 8:
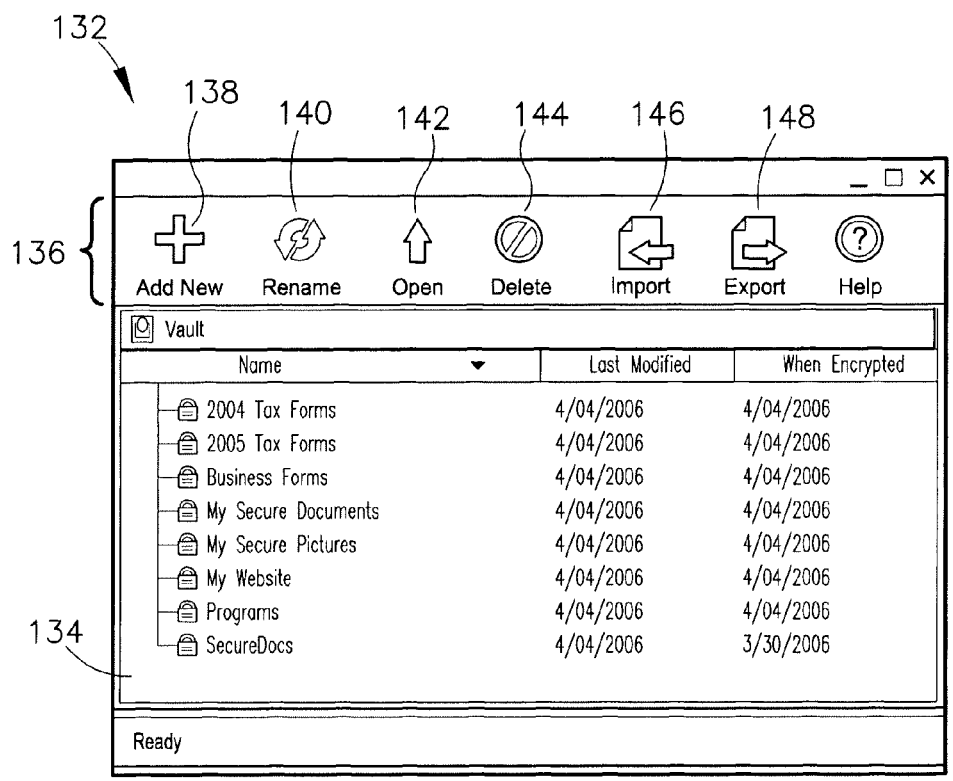
FIG. 8 is an exemplary user interface associated with the computer program for enabling a user to manage a plurality of secure repositories.

An exemplary vault manager interface 132 is illustrated in FIG. 8. The vault manager interface 132 presents a list 134 of vaults and a toolbar 136 for managing the vaults. An add button 138 enables the user to create a new vault. When the user selects the add button 138 the program enrolls primary biometric data, receives a name of the vault, and creates a vault associated with the primary biometric data, as explained above. The new vault is then presented in the list 134. The user may create as many new vaults as he or she wishes.

A rename button 140 enables the user to rename an existing vault, the program may require authentication for this action. An open button 142 enables the user to open a vault selected from the list 134 of vaults in order to view and manage the contents of the vault. The program requires the user to submit biometric data before opening the vault, and only opens the vault if the submitted biometric data matches the primary biometric data or secondary biometric data. A delete button 144 enables the user to delete a selected vault, and the program may require authentication before performing the delete operation, and may prompt the user to confirm his or her desire to delete the vault. Alternatively, the program may require the user to submit a password in addition to or in lieu of the biometric data before opening a vault.

An import button 146 enables the user to associate an existing vault with the vault manager interface 132, such as where the vault was previously exported. When a user selects the import button 146, the program presents a list of drives and folders from which the user may select an exported vault. An export button 148 enables the user to save a copy of a vault included in the list 134. The user first selects a vault from the list 134, then selects the export button 148, and selects an export location in a conventional manner via, for example, a list of storage locations generated by the program. When the user selects the vault and the location, the program creates a copy of the vault and stores the copy in the designated location. The original vault remains accessible to the user via the vault manager interface 132.

The program may be stored entirely on, and may be executed from, the external storage device 18 with built-in biometric sensor 36 without the need to install the program on the computer 10. The device 18 may be connected to the computer 10 via a hot-swapable connection standard such as the Universal Serial Bus (USB), wherein the drive 18 may be connected to and removed from the computer 10 while the computer 10 is running. Furthermore, each vault associated with the program may be stored on the external hard drive 18, so that the program, biometric sensor 36, and encrypted data are bound in a single package that can be moved from a first computer 10 to a second computer 22 simply by unplugging the drive 18 from the first computer 10 and plugging it into the second computer 22. Alternatively, the program and associated vaults may be stored entirely on an internal storage device of the computer 10.

The user may be allowed to choose from various options at the time of purchase of the program, during use of the program, or both. For example, the user may choose a type of encryption to be used by the program including, for example, AES256, Blowfish 448, and 3DES, among others. Furthermore, the user may be allowed to choose what type of information, if any, the program requires before granting access to a secure repository. The user may set up the program to require biometric data only, a password only, either biometric data or a password, or both biometric data and a password.

When the program is set up to require only a password, the program generates or uses an artificial biometric template, as explained above, and creates an encryption key in a manner similar to that explained above using the biometric data. When using only a password to authenticate a user, however, the program may supplement the artificial biometric template with information taken or derived from the password. The program may authenticate the password by comparing the password with a copy of the password stored in a database before granting access to the secure repository.

Although the invention has been described with reference to the preferred embodiments illustrated in the attached drawings, it is noted that equivalents may be employed and substitutions made herein without departing from the scope of the invention as recited in the claims. It will be appreciated, for example, that invention may be implemented entirely on a portable wireless device 32, such as a laptop or notebook computer, or a handheld device approximately the size of a user's hand such as a wireless telephone, portable digital assistant, or similar device, wherein the device includes an attachable or built-in biometric data sensor 34.

Having thus described a preferred embodiment of the invention, what is claimed as new and desired to be protected by Letters Patent includes the following:

1. A non-transitory computer-readable medium encoded with code segments for enabling a secure storage system having a secure repository for storage of files, the computer-readable medium comprising:

a code segment for receipt of information associated with a security template of a user, wherein said security template is associated with said secure repository;

a code segment for receiving information indicative of a request by the user to access the secure repository during a first session;

upon receipt of said information indicative of the user's request to access the secure repository during said first session, a code segment for receiving information associated with a first authentication template of the user to access the secure repository during the first session;

a code segment for comparing the information associated with the first authentication template with the information associated with the security template;

upon the information associated with the first authentication template correlating with the information associated with the security template, a code segment for generating a first key to use for encrypting at least one file stored within the secure repository or decrypting at least one file removed from the secure repository during said first session, wherein the first key is at least partially based on at least one of the security or first authentication templates;

a code segment for encrypting or decrypting at least one file using said first key during said first session;

a code segment for terminating the first session upon a first event;

a code segment for destroying the first key in association with terminating the first session, such that only the information associated with said security template is preserved;

subsequent to termination of the first session, a code segment for receiving information indicative of a request by the user to access the secure repository during a second session;

upon receipt of said information indicative of the user's request to access the secure repository during said second session, a code segment for receiving information associated with a second authentication template of the user to access the secure repository during the second session;

a code segment for comparing the information associated with the second authentication template with the information associated with the security template;

upon the information associated with the second authentication template correlating with the information associated with the security template, a code segment for generating a second key to use for encrypting at least one file stored within the secure repository or decrypting at least one file removed from the secure repository during said second session;

a code segment for encrypting or decrypting the at least one file using said second key during said second session;

a code segment for terminating the second session upon a second event; and a code segment for destroying the second key in association with terminating the second session, such that only the information associated with said security template is preserved, wherein each file stored within the secure repository is uniquely encrypted.

2. The computer-readable medium as set forth in claim 1, further comprising— wherein upon the user being allowed access to the secure repository during either of the first or second sessions, a code segment for storing one or more files or one or more folders in said secure repository, and a code segment for encrypting said one or more files or one or more folders upon storing said files or folders in the secure repository.

3. The computer-readable medium as set forth in claim 1, wherein the access to the secure repository for either of the first or second sessions is the opening of the secure repository.

4. The computer-readable medium as set forth in claim 1, wherein the access to the secure repository for either of the first or second sessions is the transfer of a file or folder to or from the secure repository.

5. The computer-readable medium as set forth in claim 1, wherein the access to the secure repository for either of the first or second sessions is the opening of a file or folder stored in the secure repository.

6. The computer-readable medium as set forth in claim 1, wherein either of said first or second events is the elapse of a predetermined amount of time.

7. The computer-readable medium as set forth in claim 1, wherein either of said first or second events is a closing of the secure repository.

8. The computer-readable medium as set forth in claim 1, further including a code segment for automatically encrypting computer files to be written to the secure repository and automatically decrypting computer files to be read from the secure repository.

9. The computer-readable medium as set forth in claim 1, wherein the first and second keys are, respectively, at least partially based on the first and second authentication templates received from the user.

10. The computer-readable medium as set forth in claim 1, wherein either of the first or second authentication templates includes a password created by the user.

11. The computer-readable medium as set forth in claim 1, wherein either of the first or second authentication templates includes biometric data associated with the user.

12. The computer-readable medium of claim 1, wherein said code segment for generation of information associated with said security template comprises a code segment for encrypting said security template.

13. The computer-readable medium of claim 1, wherein said code segment for generation of information associated with either of said first or second authentication templates comprises a code segment for encrypting said respective authentication template.

14. The computer-readable medium of claim 1, further including a code segment for deleting the first generated information associated with the authentication information upon termination of the first session and the second generated information associated with the authentication information upon termination of the second session.

* * * * *